United States Patent [19]

Kikuta et al.

[11] Patent Number: 4,848,502
[45] Date of Patent: Jul. 18, 1989

[54] CONSTANT VEHICLE SPEED RETAINING DEVICE FOR MOTORCYCLE

[75] Inventors: Junji Kikuta, Misato; Masayuki Kudo, Shiki; Tetsuo Yamagata, Tokyo; Yoshiyuki Nakajima, Takahagimachi, all of Japan

[73] Assignee: Honda Giken Kogyo Kabushiki Kaisha, Tokyo, Japan

[21] Appl. No.: 129,214

[22] Filed: Dec. 7, 1987

[30] Foreign Application Priority Data

Dec. 5, 1986 [JP] Japan .................. 61-290259

[51] Int. Cl.⁴ .................................. B60K 31/04
[52] U.S. Cl. ...................... 180/179; 74/489;
 74/502.2; 74/523; 74/557; 180/176; 180/219
[58] Field of Search ............. 180/219, 176, 177, 179,
 180/335; 74/489, 506

[56] References Cited

U.S. PATENT DOCUMENTS

| | | | |
|---|---|---|---|
| 4,364,283 | 12/1982 | Ricardo | 74/506 |
| 4,580,537 | 4/1986 | Uchiyama | 123/352 |
| 4,610,230 | 9/1986 | Saito et al. | 123/360 |
| 4,611,561 | 9/1986 | Suyama | 180/175 |
| 4,645,027 | 2/1987 | Masuda | 180/219 |

FOREIGN PATENT DOCUMENTS 61-6032 1/1986 Japan .

Primary Examiner—Charles A. Marmor
Assistant Examiner—Eric Culbreth
Attorney, Agent, or Firm—Pollock, Vande Sande & Priddy

[57] ABSTRACT

A constant vehicle speed retaining device for motorcycle, comprising a control mechanism connected to a cable provided between a throttle valve and a throttle grip, for controlling the angle of opening of the throttle valve during the time interval between a constant speed control command and a cancellation command. A set switch generates the constant speed command, and a cancellation switch generates the cancellation command to the control mechanism. The cancellation switch is located near the throttle grip and operates in response to rotation of the latter in a decelerating direction.

2 Claims, 6 Drawing Sheets

CONSTANT VEHICLE SPEED RETAINING DEVICE FOR MOTORCYCLE

FIELD OF THE INVENTION

The present invention relates to a constant vehicle speed retaining device for a motorcycle (including a tricycle).

BACKGROUND OF THE INVENTION

Generally, a constant vehicle speed retaining device is provided to reduce fuel consumption by suppressing fluctuations in vehicle speed.

Such a known constant vehicle speed retaining device is disclosed in Japanese Published Patent Application No. 61-6032. In the conventional constant vehicle speed retaining device disclosed in this reference, a switch for cancelling the operation of the device is mounted to a cable member for transmitting a torque of a throttle grip to a throttle valve in a suction system of an engine mounted in the motorcycle. The operation of the constant vehicle speed retaining device may be cancelled by operating the throttle grip. However, as the cancellation switch is generally mounted to the cable member between the throttle grip and the throttle valve, independent wiring must be provided for connecting the cancellation switch to a control circuit as a center of the constant vehicle speed retaining device, necessitating a complicated wiring operation.

SUMMARY OF THE INVENTION

It is an object of the present invention to provide a constant vehicle speed retaining device for a motorcycle which simplifies the wiring operation.

According to the present invention, the constant vehicle speed retaining device is provided with a cancellation switch for generating a cancellation command to a means for controlling constant vehicle speed running of the motorcycle, thereby cancelling this constant vehicle speed running control. The cancellation switch is located in the vicinity of a throttle grip, and is adapted to be operated when the throttle grip is rotated by a torque greater than a predetermined level.

BRIEF DESCRIPTION OF THE DRAWINGS

In order that the invention may be more clearly understood, reference will now be made to the accompanying drawings, wherein several embodiments of the invention are shown for purposes of illustration, and wherein:

FIG. 9 is a plan view of the slip ring shown in FIG. 7.

DESCRIPTION OF PREFERRED EMBODIMENTS

Figure 1:
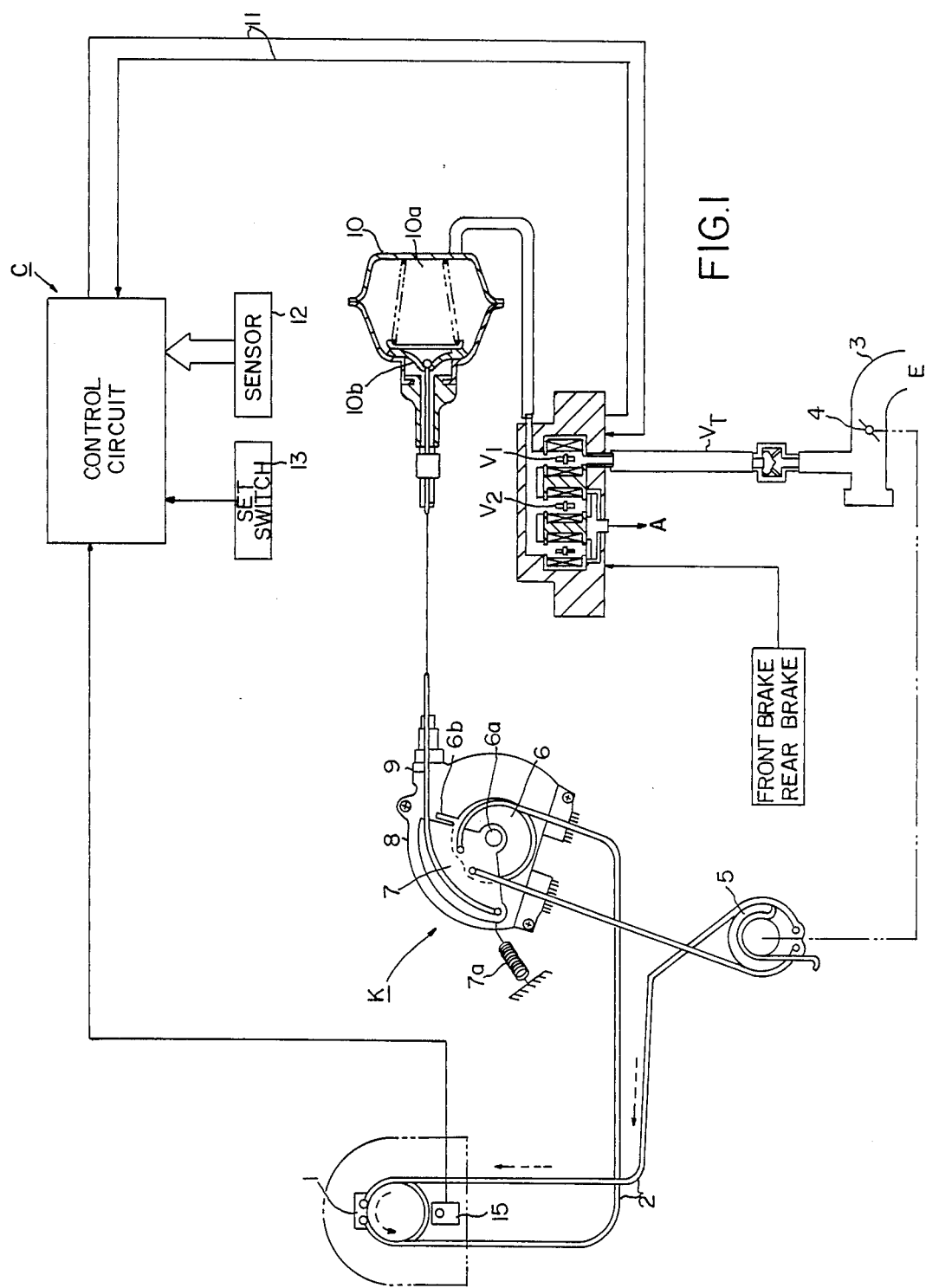
FIG. 1 is a system diagram of the constant vehicle speed retaining device.

FIG. 1 shows a constant vehicle speed retaining device having a throttle grip 1 provided on a vehicle handle for accelerating and decelerating engine rotational speed. The torque of the throttle grip 1 is transmitted through a cable member 2 to define an opening angle of a throttle valve 4 provided in a suction pipe 3 of an engine E.

The cable member 2 is endlessly wound around a rotary shaft of the throttle grip 1 and a rotary shaft to a valve link 5 for opening and closing the throttle valve 4 in such a manner as to be curved in a range permitting the torque transmitting function of the cable member 2.

Connected to the cable member 2 is a throttle opening adjusting mechanism K for controlling the cable member 2 and adjusting a throttle opening. The throttle opening adjusting mechanism K includes a throttle grip link 6 rotatably mounted on a pivotal shaft 6a for rotation in response to the rotation of the throttle grip 1, and a throttle link 7 rotatably mounted on the pivotal shaft 6a in association with the throttle grip link 6. The throttle grip link 6 is formed with a projecting stop 6b adapted to abut against a side surface of the throttle link 7, thereby limiting the counterclockwise rotation of the throttle grip link 6. The throttle link 7 is connected to one end of a cable member 9 as shown in FIG. 1, and the operation of an actuator 10 is designed to be directly transmitted through the cable member 9 to the throttle link 7. That is, when the cable member 9 is pulled rightwardly as viewed in FIG. 1 by the operation of the actuator 10, the throttle link is rotated clockwise about the pivotal shaft 6a against the elastic force of a return spring 7a connected to the throttle link. FIG. 1 shows a condition where the throttle link 7 is pulled by the cable member 9 to abut against the stop 6b of the throttle grip link 6. Reference numeral 8 designates a casing for the links 6 and 7 and other members. For the sake of convenience, the cable members 2 and 9 will hereinafter be referred to as a first cable member 2 and a second cable member 9, respectively. The second cable member 9 may be replaced by any transmitting means such as a rod member having the same function and being connected to a diaphragm 10b in the actuator 10 which will be described hereinafter.

The other end of the second cable member 9 is connected to the actuator 10 as a driving means for the second cable member 9. In this embodiment, the second cable member 9 is directly connected to the diaphragm 10b adapted to be expanded and contracted by an engine vacuum induced in a vacuum chamber 10a. The induction of the engine vacuum to the actuator 10 is carried out from a suction pipe 3 of the engine E through a vacuum tank $V_T$ and an acceleration vacuum valve $V_1$. Reference numeral $V_2$ designates a vent valve for inducing an atmosphere A at deceleration. The opening and closing operation of the valves $V_1$ and $V_2$ is carried out by a control signal 11 from a control circuit C.

The control circuit C is constituted of a microprocessor or the like, and is adapted to generate a control signal responsive to engine parameters such as a vehicle speed signal and a brake switch signal as obtained from various sensors 12. When a set switch 13 for commanding the settling of a vehicle speed at a constant value is turned on during running of the vehicle, a vehicle speed retention command is fed to the control circuit C. In response thereto, the control circuit C generates the control signal 11 to adjust opening degrees of the acceleration vacuum valve $V_1$ and the deceleration vent valve $V_2$. The vacuum in the vacuum chamber 10a of the actuator 10 is adjusted by the opening and closing operation of each valve, thereby transmitting the expansive and contractive operation of the diaphragm 10b through the second cable member 9 to the throttle link 7 of the throttle opening adjusting mechanism K. The rotative angle of the throttle link 7 is transmitted through the first cable member 2 and the valve link 5 to the throttle valve 4.

Thus, a means for controlling the opening angle of the throttle valve 4 to attain a constant vehicle speed running control of the motorcycle is provided.

As shown in FIG. 1, a cancellation switch 15 is provided in the vicinity of the throttle grip 1. The cancellation switch 15 is adapted to generate a cancellation command for stopping the constant vehicle speed running control to the aforementioned control means during the execution of such control.

Figure 2:
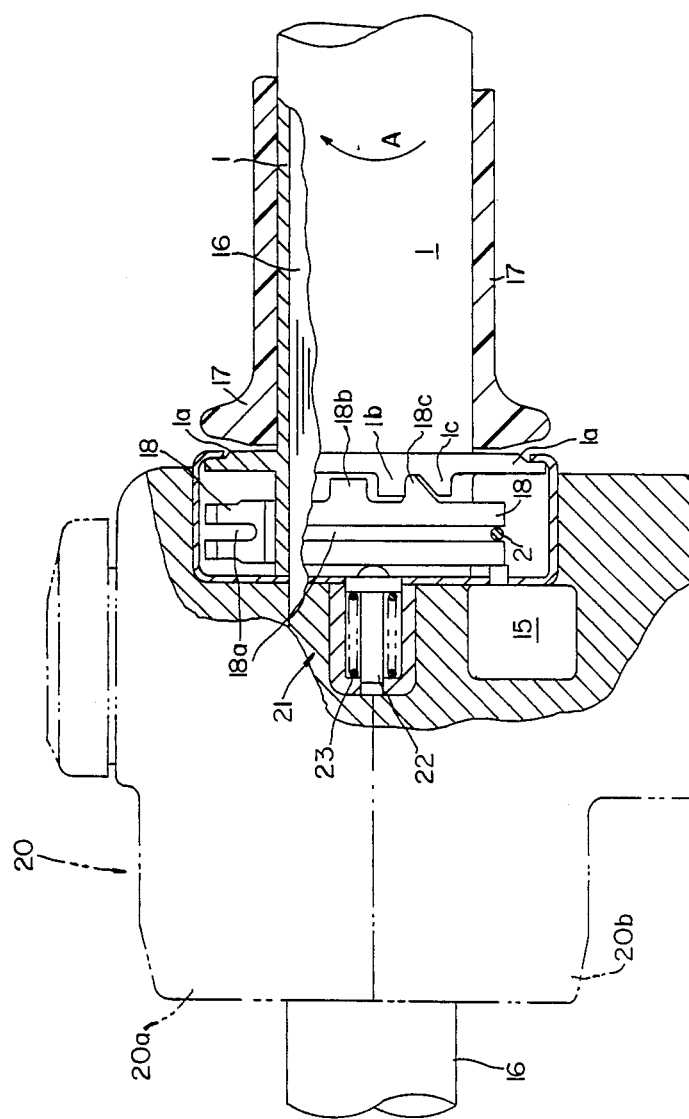
FIGS. 2 and 3 are sectional views of a part in the vicinity of the throttle grip in the first embodiment.
Figure 4:
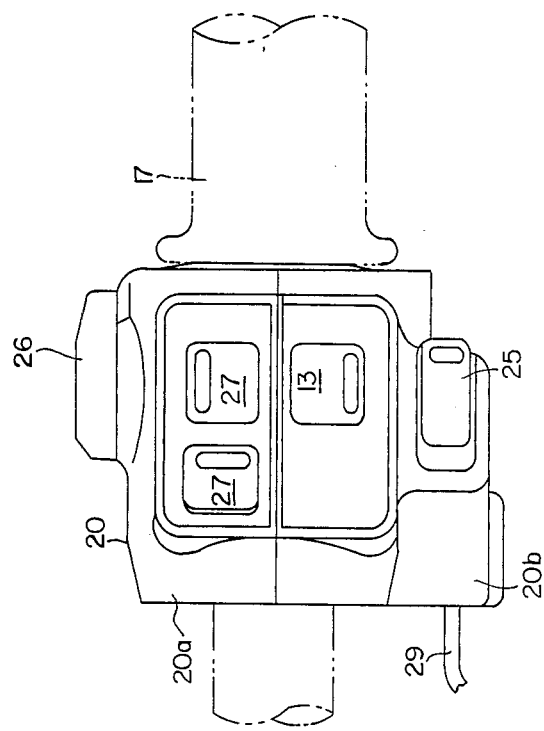
FIG. 4 is an elevational view of the handle switch housing.

FIG. 2 is a cross section of a part in the vicinity of the throttle drip 1. The throttle grip is a cylindrical member rotatably engaged with a right end portion of a handle pipe 16, a part of which is shown. The throttle grip 1 is formed with a flange 1a, and a portion of the throttle grip 1 on the right side of the flange 1a is covered with a rubber grip 17. On the opposite side of the rubber grip 17 with respect to the flange 1a, an annular slide member 18 is connected to the cable member 2. The slide member 18 is slidable on the outer circumferential surface of the throttle grip 1. The slide member 18 is formed on its outer circumference with a groove 18a to be engaged with the cable member 2. As shown in FIG. 2, the flange 1a and the slide member 18 are covered with a handle switch housing 20. The handle switch housing 20 is provided with a means 21 for biasing the slide member 18 toward the flange 1a and the aforementioned cancellation switch 15. As shown in FIG. 4, the handle switch housing 20 is furhter provided with an engine starter switch 25, an engine kill switch 26, operation switches 27 for commanding acceleration and deceleration, etc. to the control circuit C, and the aforementioned set switch 13. The handle switch housing 20 is constituted of separate members 20a and 20b which are connected by a connecting means such as bolts (not shown).

A bundle of wirings 29 each discretely connected to the switches 13, 15, 25, 26 and 27 is provided to extend from the handle switch housing 20. The wirings 29 are bundled by a wire harness (not shown).

The flange 1a of the throttle grip and the slide member 18 are formed on their respective opposed surfaces with projections 1b and 1c and projections 18b and 18c, respectively, which engage each other. The projections 1c and 18c have matching inclined surfaces opposed to each other. The biasing means 21 for biasing the slide member 18 comprises a push rod 22 abutting against the slide member 18 and a coil spring 23 for applying a biasing force to the push rod 22.

When the constant vehicle speed running control by the aforementioned control means is not in operation, the slide member 18 receives a deceleration torque through the cable member 2 by a means (not shown) for biasing the throttle valve 4 in a closing direction, and also receives the biasing force of the biasing means 21. Accordingly, the slide member 18 and the throttle grip 1 are engaged with each other by the projections 18c and 1b, thereby allowing the torque of the throttle grip 1 to be transmitted directly to the throttle valve 4.

When the set switch 13 is manually operated to generate a constant vehicle speed control command, the control means is operated to adjust the opening angle of the throttle valve 4 and conduct the constant vehicle speed running control at an appropriate vehicle speed. Under the constant vehicle speed running control condition, the slide member 18 is retained by the cable member 2 at a rotative position corresponding to the opening angle of the throttle valve 4. Therefore, the throttle grip 1 is allowed to rotate independently of a forcibly opening and closing cable constituted of the cable member 2 and the slide member 18 as provided between the throttle grip 1 and the throttle valve 4. Under these conditions, when the throttle grip 1 is rotated in the decelerating direction (indicated by arrow A in FIG. 2), the inclined surface of the projection 1c of the throttle grip 1 is brought into abutment agaisnt the inclined surface of the projection 18c of the slide member 18. When the throttle grip 1 is further rotated by a force greater than a predetermined level, a reactive force having the same strength as this force and a direction reverse thereto is applied from the slide member 18 to the throttle grip 1. Since the rotative position of the slide member 18 is retained by the cable member 2 after the abutment of the inclined surfaces, the slide member 18 is slid leftwardly as viewed in FIG. 2 into the position shown in FIG. 3 along the inclined surface against the biasing force for the biasing means 21. As a result, the slide member 18 operates to push a button of the cancellation switch 15, which in turn generates a cancellation command to the control circuit C as a center of the control means. This results in cancellation of the constant vehicle speed running control.

When the throttle grip 1 is further rotated in the decelerating direction, the projection 1b is brought into engagement with the projection 18b to thereby rotate the slide member 18 in the decelerating direction. In association with this rotation of the side member 18, the opening angle of the throttle valve 4 is decreased to thereby reduce the vehicle speed.

When the constant vehicle speed running control is cancelled in the above-mentioned manner, the slide member 18 again receives the deceleration torque through the cable member 2 and, as a result, the arrangement of the slide member 18 and the throttle grip 1 is returned to the condition shown in FIG. 2 by the deceleration torque and the biasing force of the biasing means 21.

The force greater than a predetermined level, mentioned above, may be a force sufficient for sliding the slide member 18 along the inclined surfaces of the projections 1c and 18c against the biasing force of the biasing means 21.

Figure 3:
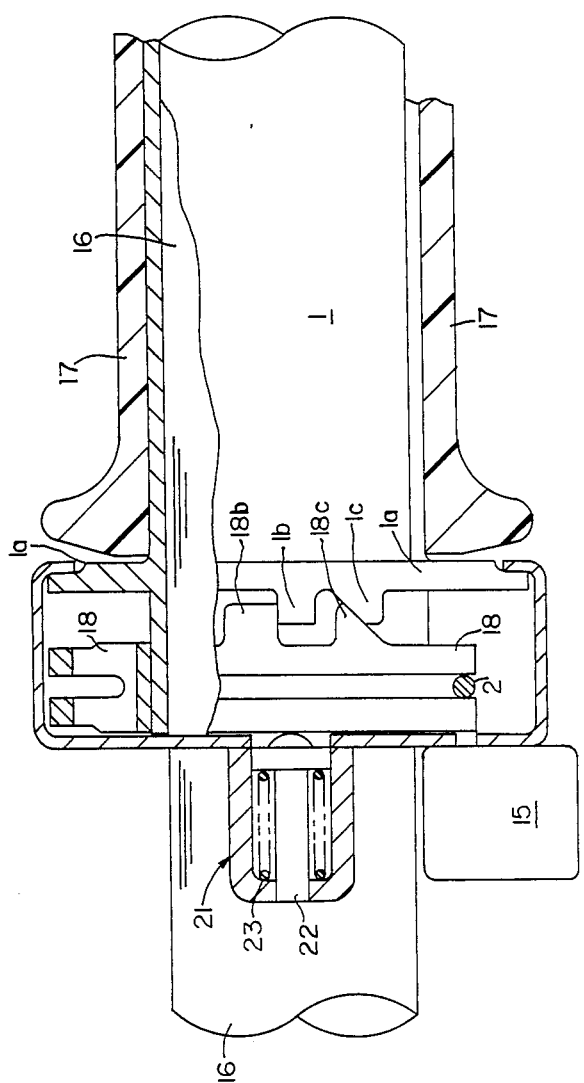
Figure 5:
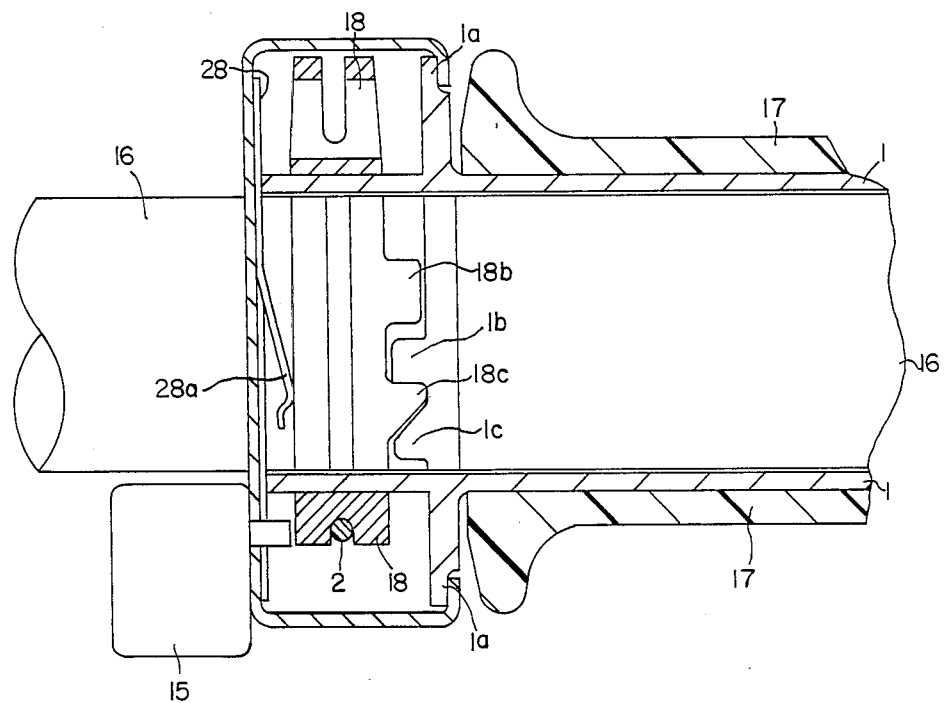
FIG. 5 is a sectional view of a part in the vicinity of the throttle grip in the second embodiment.
Figure 6:
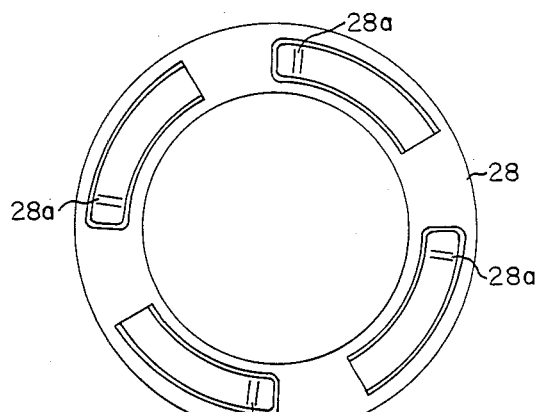
FIG. 6 is a plan view of the leaf spring shown in FIG. 5.

FIG. 5 shows a second embodiment of the present invention which uses a leaf spring 28 in substitution for the biasing means 21 shown in FIGS. 2 and 3. In the second embodiment, the structure of the biasing means may be advantageously simplified by the use of the leaf spring 28. As shown in FIG. 6, the leaf spring 28 is formed in an annular shape, and has a plurality of abutment portions 28a abutting against the slide member 18.

Figure 7:
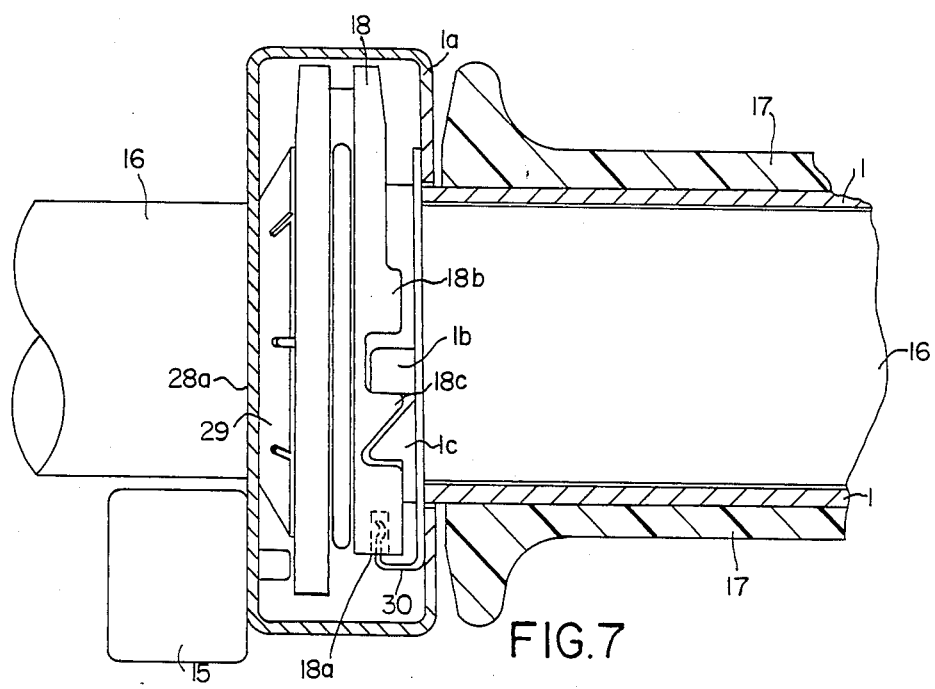
FIG. 7 is a sectional view of a part in the vicinity of the throttle grip in the third embodiment.
Figure 8A:
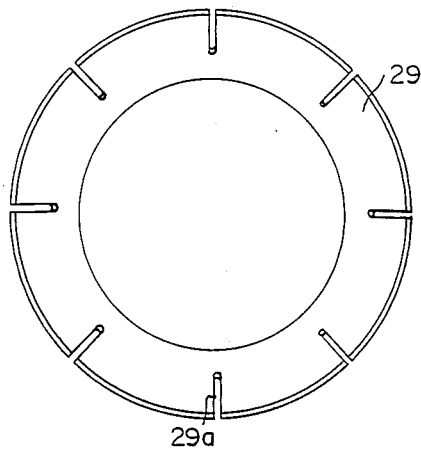
FIG. 8 is a plan view of the leaf spring shown in FIG. 7.
Figure 8B:
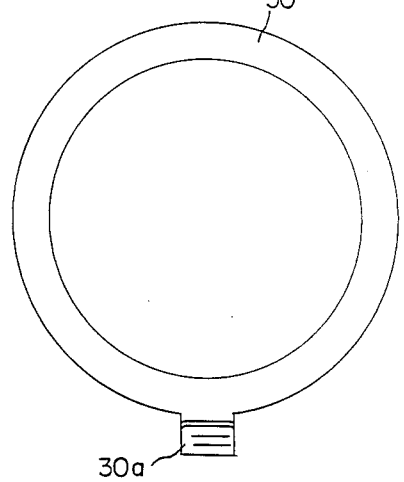

FIG. 7 shows a third embodiment of the present invention wherein a leaf spring 29 and a slip ring 30 are substituted for the biasing means 21 and the flange 1a, respectively, shown in FIGS. 2 and 3. In the third embodiment, an axial dimension of the handle pipe 16 may be shortened by the use of the leaf spring 29 and the slip ring 30. As shown in FIG. 9, the slip ring 30 is formed with a projection 30a insertable into a recess 18a defined on the circumference of the slide member 18. A plurality of projections 1b and 1c are engaged with the slip ring 30.

In the above embodiments, the cancellation switch 15 is operated when the throttle grip 1 is rotated in the decelerating direction by a torque greater than a predetermined level. Alternatively, the cancellation switch 15 may be operated when the throttle grip 1 is rotated by a torque greater than a predetermined level in an accelerating direction, by modifying the patterns of the proejctions 1b, 1c, 18b and 18c.

Further, the cancellation switch 15 may be theoretically replaced by a stress detecting means such as a strain gauge capable of detecting such a torque as provided on the throttle grip 1.

As described above, the constant vehicle speed retaining device for a motorcycle according to the present invention utilizes a reactive force applied from the forcibly opening and closing cable connected to the throttle valve to the throttle grip under the constant vehicle speed running control. The switch for canceling the constant vehicle speed running control is operated when the throttle grip is rotated against the reactive force. Therefore, the cancellation switch may be located in the vicinity of the throttle grip.

Furthermore, the wiring extendingn from the cancellation switch may be combined with the other wirings extending from the other switches provided in the vicinity of the throttle grip, thereby simplifying the wiring operation.

What is claimed is:

1. A constant vehicle speed retaining device for a motorcycle, comprising a throttle valve, a forcibly opening and closing cable provided between said throttle valve and a throttle grip, a control means connected to said cable for controlling an opening angle of said throttle valve during a time interval from a constant vehicle speed control command to a cancellation command so as to effect a constant vehicle speed control command to said control means, and a cancellation switch for generating said cancellation command to said control means, wherein said cancellation switch is located in the vicinity of said throttle grip, and is adapted to be operated when a force greater than a predetermined level is applied from said cable to said throttle grip, and wherein said throttle grip is rotatable relative to said cable when said force is applied to said throttle grip, and said cancellation switch is actuated by said cable upon relative rotation of said throttle grip.

2. The constant vehicle speed retaining device as claimed in claim 1, wherein said cancellation switch and said set switch are arranged in a handle switch housing.

* * * * *